Figure 1:
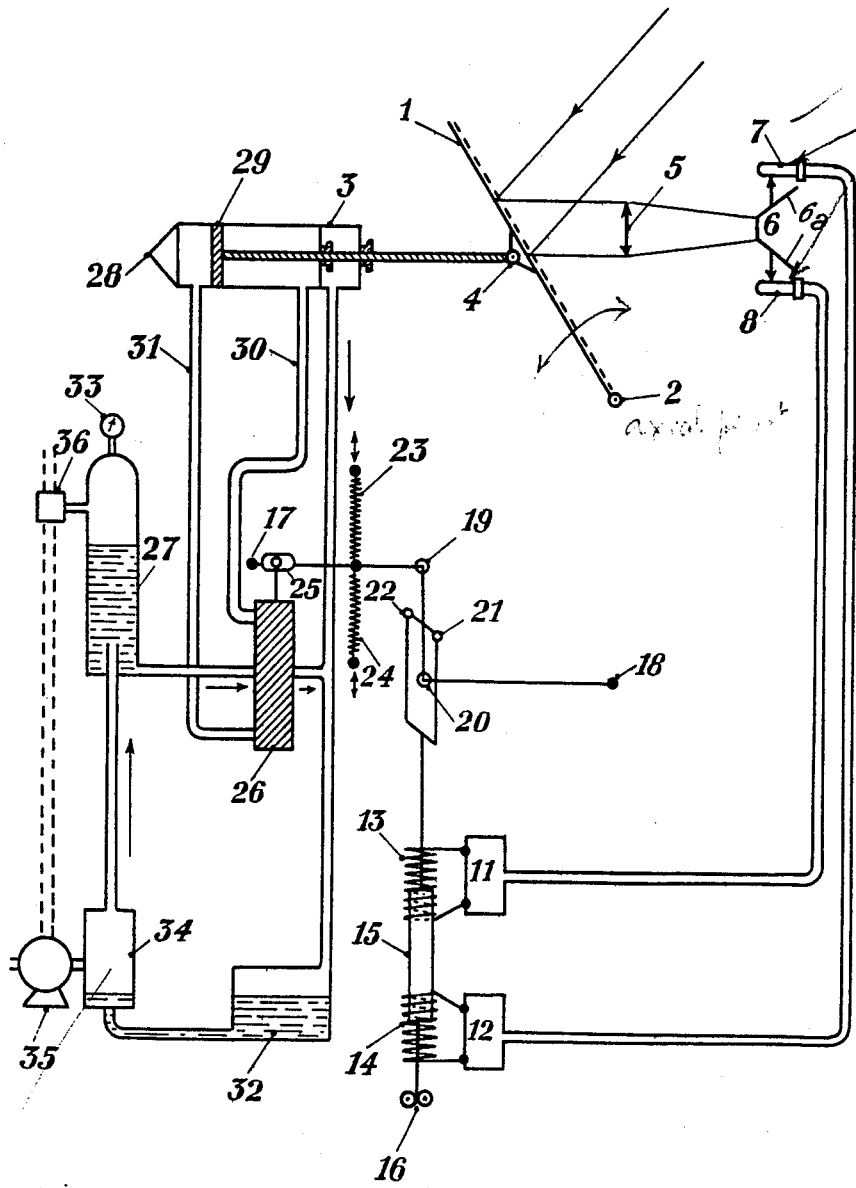

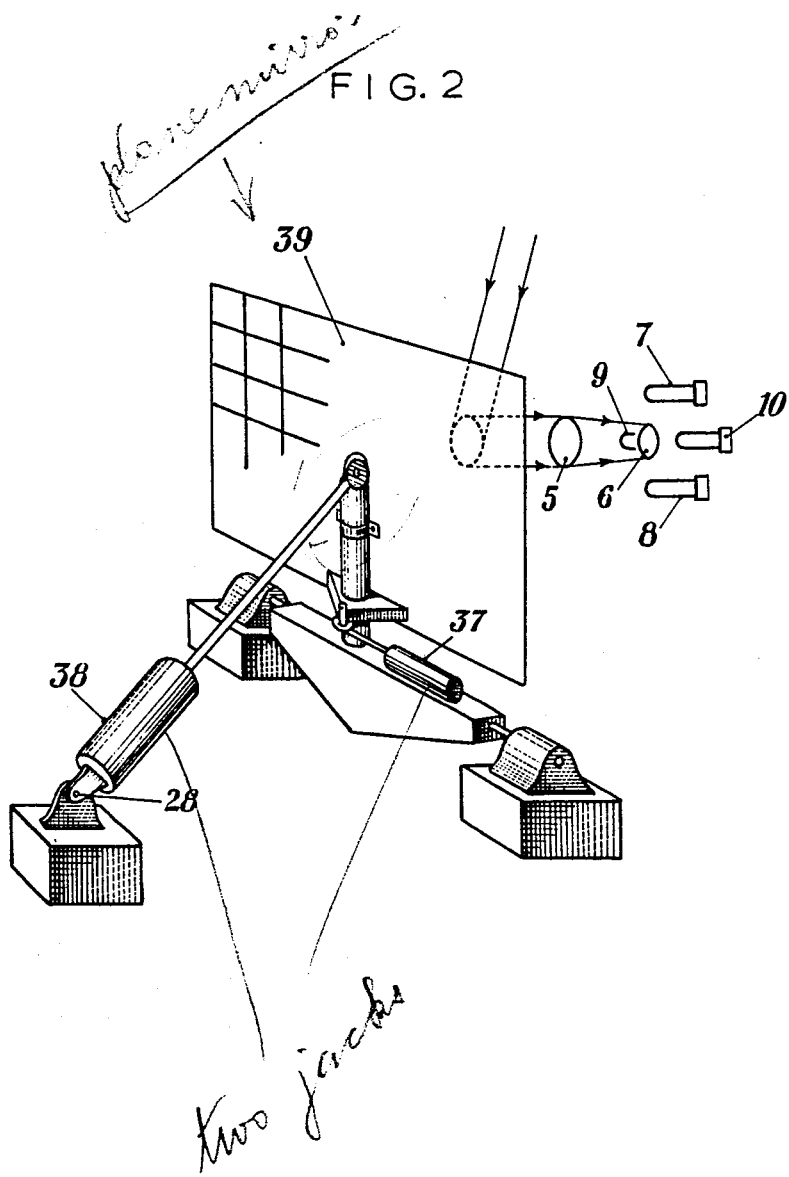

United States Patent Office 2,712,772
Patented July 12, 1955

2,712,772

SELF-REGULATING AUTOMATIC HELIOSTAT REFLECTING MIRROR DEVICE

Felix Trombe, Paris, France, assignor to Centre National de la Recherche Scientifique, Paris, France, a society of France Application July 24, 1953, Serial No. 369,996

Claims priority, application France July 24, 1952

4 Claims. (Cl. 88—25)

The present invention relates to a device for maintaining in a fixed direction a beam of rays, and in particular a beam of sun rays.

It has already been proposed for this purpose to make use of a flat mirror, which will be hereinafter called "heliostat," the position of which is adjustable by means of power elements preferably constituted by jacks, which mirror is to reflect the rays or a portion thereof in the form of a well limited beam of fixed direction. For this purpose, cells responsive to said radiation are disposed laterally of said beam so as to operate said power elements every time the axis of the beam deviates from said fixed direction and it becomes necessary to readjust the position of the reflecting mirror.

In known devices of this kind, four ray sensitive cells, and in particular photo-electric cells, act in both directions on two motors which control, through a speed reducing gear, mechanical jacks acting at right angles to each other and which thus adjust the position of the heliostat.

Discontinuous mechanisms including a set of contacts capable of bringing into circuit, in the motors which operate the heliostat, currents of variable intensities, make it possible to perform the adjustment by a hit and miss method in one direction or the other.

Such devices have the drawbacks that the number of contacts that is necessary is very high and the hit and miss control necessarily produces oscillations of the heliostat about its normal position. It is therefore necessary to introduce in the circuits electrical or mechanical delay devices to control the contacts.

The object of my invention is to eliminate these drawbacks and to obtain a simple and automatic device achieving a continuous and progressive adjustment without oscillation.

The device according to the present invention is essentially characterized in that the power elements which serve to give the heliostat the desired position are operated by a fluid under pressure, and in particular a liquid under pressure, the feed of which is controlled by a valve member (such as a slide valve) which is itself operated in response to the currents supplied by the ray sensitive cells so that at any time the control energy supplied by the cell or cells subjected to the rays to be controlled is proportional to the energy supplied to the power elements by the fluid under pressure.

In other words, the flow rate of said fluid under pressure depends upon the intensity of the current, advantageously amplified, supplied by the cell or cells responsive to the rays, and in particular to the sun rays.

Such a device achieves a stable, progressive and gradual adjustment, eliminates oscillations of the mirror and does not require circuit breakers.

My device is applicable to the automatic adjustment of all rays, but for the sake of clarity, in the following description it will be supposed that it is applied to the case of sun rays.

Preferred embodiments of my invention will be hereinafter described, with reference to the accompanying drawings, given merely by way of example, and in which:

Fig. 1 diagrammatically shows a device according to my invention, the adjustment of the reflecting mirror being effected only in one direction, that is to say about a single axis;

Fig. 2 shows the arrangement of two jacks acting on the reflecting mirror to pivot it about two axes at right angles to each other.

In the device diagrammatically shown by Fig. 1, the sun rays are received by a reflecting mirror 1 rotatable about an axis 2 and connected to the end of the piston rod of jack 3 about a movable axis 4.

The reflected beam from mirror 1 passes through a lens 5 having a sufficient focal length (from 1 to 2 metres) which forms an image upon a screen 6 of a size substantially equal to that of the image of the sun.

The beam which strikes screen 6 is therefore well determined and the straight line passing through the center of lens 5 and the center of screen 6 indicates the direction which must be maintained for the light beam reflected by mirror 1. As long as the image of the sun remains on screen 6, the reflected beam has the desired direction.

Two photo-electric cells 7, 8 are disposed laterally of screen 6 on either side thereof, and they receive from reflectors 6a rays from a portion of the beam when the sun image is no longer centered on screen 6.

The currents supplied by the photo-electric cells, under the effect of the sun rays that may strike them, are amplified by electronic devices 11 and 12 so that, at the output of said amplifying device, there is available an energy which ranges, according to the intensity of the sun rays striking the cells, from some tenths of a watt to some tens of watts.

The amplified current then passes through two solenoids 13 and 14 corresponding respectively to cells 8 and 7. In both of these solenoids is placed a cylindrical piece of soft iron 15 moving vertically upwardly and downwardly and the lower portion of which carries a guiding rod sliding without friction in the grooves of two rollers at 16. This rod 15 is carried by a mechanism which keeps it substantially along the same line.

When photo-electric cell 7 feeds current to solenoid 14, iron rod 15 is moved downwardly and when photo-electric cell 8 is energized, rod 15 is moved upwardly.

The force acting upon bar 15 depends upon the current created in the photo-electric cells, that is to say upon the amount of sun rays that is striking them. When no current is passing through said solenoids 13 and 14, the soft iron bar 15 is in balanced or neutral position. The displacements of said bar 15 are transmitted to the mechanism to which said bar is suspended (including fixed axes 17 and 18, and movable axes 19, 20, 21 and 22), whereby as above stated said soft iron bar 15 is displaced with a substantially rectilinear movement coinciding with its axis, inside solenoids 13 and 14.

The above mentioned mechanism includes two springs 23 and 24 which urge the whole toward neutral position, these springs resiliently opposing the displacements of bar 15 under the action of the solenoids.

Upon the lever arm which pivots about fixed axis 17 there is provided a movable axis 25 which is connected with the slide valve 26 which receives a liquid, for instance oil, under pressure from a reservoir 27.

The displacements of said slide valve are adapted to send, through suitable conduit means, oil under pressure into one or the other of the chambers of jack 3, the rate of flow of said oil depending upon the displacement of slide valve 26, which itself depends upon the displacements of bar 15 when it is moved away from its balanced position under the effect of the energizing of cell 7 or 8.

For instance, when no current is flowing through solenoids 13 and 14, the transmission system is in neutral position and jack 3 does not receive any oil under pressure.

If cell 7 for instance is energized by sun rays, it acts upon bar 15 through amplifier 12 and solenoid 14, axis 25 is moved down and drives valve 26 in the same direction, thus opening the communication between the source of oil under pressure and the rear chamber of jack 3. If cell 8 is energized by sun rays and through similar means, axis 25 is moved upwardly together with slide valve 26 and causes oil under pressure to be fed into the front chamber of jack 3.

Jack 3 is pivoted about axis 28. It includes a piston 29 the rod of which is hinged to mirror 1 about axis 4; the front and rear chambers of the cylinder of said jack are connected to slide valve 26 through conduits 30 and 31 and to reservoir 32 through a pipe for the discharge under normal pressure of the oil resulting from leaks in jack 3 and evacuation from slide valve 26.

In the arrangement illustrated by Fig. 1, the conduits which connect slide valve 26 with jack 3 are alternately under pressure and at normal pressure, and such that when one of them is fed with oil under pressure and acts upon the piston of said jack, the other one serves to the evacuation under normal pressure of the oil contained in the other chamber of the jack.

Reservoir 27 contains oil, placed under the pressure indicated by pressure gauge 33 by compressor 34 driven by motor 35. This motor is controlled by a manostat 36 which thus permits of adjusting the working oil pressure.

Compressor 34 is connected through a pipe with reservoir 32 which receives under normal pressure the oil discharged from jack 3 and from slide valve 26, whereby the oil circulates in a closed circuit.

In Fig. 2, I have shown two jacks 37 and 38 the axes of which are at right angles to each other for full adjustment of the direction of plane mirror 39, i. e. about two axes at right angles to each other. This figure also shows a group of four photo-electric cells 7, 8, 9, 10, grouped two by two, each of these groups acting upon a jack (for instance: group 7—8 acts on jack 37 and group 9—10 on jack 38) through a device such as shown by Fig. 1.

Such a device which works without contact breaking makes it possible to adjust the position of the reflecting mirror gradually and without sudden movements and to eliminate all oscillations because the rate of adjustment decreases gradually as the mirror is nearing its position of equilibrium, that is to say when the image of the sun given by lens 5 is becoming centered on screen 6.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for reflecting a beam of rays in a fixed direction which comprises, in combination, a movable mirror for reflecting said beam, a power system for moving said mirror including at least one liquid operated jack, means for operatively connecting said jack with said mirror, a source of liquid under constant pressure, conduit means for placing said jack in communication with said source, valve means inserted in said conduit means and including a movable element for controlling the rate of feed of liquid from said source to said jack in continuous relation to the displacement of said movable element from a given position of rest, at least one ray sensitive cell disposed on one side of the space occupied by the beam reflected from said mirror when said reflected beam is in said fixed direction, and electric means operative by said cell for operating said valve means movable element to feed fluid from said source to said jack in response to a deviation of said reflected beam from said fixed direction to move said movable element in continuous relation to the value of said proportion.

2. A device for reflecting a beam of sun rays in a fixed direction which comprises, in combination, a movable mirror for reflecting said beam, a power system for moving said mirror including at least one fluid operated power element, means for operatively connecting said power element with said mirror, a source of fluid under pressure, conduit means for placing said power element in communication with said source, valve means inserted in said conduit means for controlling the feed of fluid from said source to said power element, at least two photo-electric cells disposed respectively on either side of the space occupied by the beam reflected from said mirror when said reflected beam is in said fixed direction, two solenoids in line with each other, two amplifiers having their inputs conected with said cells respectively and their outputs connected with said solenoids respectively, an iron core extending axially through both of said solenoids and means operatively connecting said iron core with said valve means to feed fluid from said source to said power element in response to a deviation of said reflected beam from said fixed direction in a way to supply said power element with an energy proportional to the sun ray energy received by said cell and to correct said deviation.

3. A device according to claim 2 in which the means operatively connecting said iron core with said valve means are arranged to give said core a rectilinear displacement parallel to the common axis of said solenoids.

4. A device according to claim 2 in which conduit means for said fluid under pressure constitute a closed circuit for the circulation of said liquid.

References Cited in the file of this patent

UNITED STATES PATENTS

| | | |
|---|---|---|
| 1,938,003 | Arthuys et al. | Dec. 5, 1933 |
| 1,976,428 | Arthuys et al. | Oct. 9, 1934 |
| 2,022,144 | Nicolson | Nov. 26, 1935 |
| 2,135,997 | Arthuys | Nov. 8, 1938 |
| 2,656,764 | Johnson | Oct. 27, 1953 |